US012420384B2

(12) United States Patent
Herritz

(10) Patent No.: US 12,420,384 B2
(45) Date of Patent: Sep. 23, 2025

(54) SPARK PLUG SOCKET

(71) Applicant: Milwaukee Electric Tool Corporation, Brookfield, WI (US)

(72) Inventor: Devin W. Herritz, Sussex, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 303 days.

(21) Appl. No.: 17/884,256

(22) Filed: Aug. 9, 2022

(65) Prior Publication Data

US 2023/0034704 A1 Feb. 2, 2023

Related U.S. Application Data

(63) Continuation of application No. PCT/US2022/038522, filed on Jul. 27, 2022.

(60) Provisional application No. 63/226,586, filed on Jul. 28, 2021.

(51) Int. Cl.
*B25B 13/48* (2006.01)

(52) U.S. Cl.
CPC .................................. *B25B 13/483* (2013.01)

(58) Field of Classification Search
CPC ....... B25B 13/483; B25B 23/10; B25B 23/08; H01T 13/08; H01T 13/56
See application file for complete search history.

(56) References Cited

U.S. PATENT DOCUMENTS 2,956,462 A * 10/1960 Paul ...................... B25B 13/483 81/125
3,322,007 A * 5/1967 Cunningham ........ B25B 13/483 81/125
3,869,945 A * 3/1975 Zerver .................. B25B 13/483 81/125
5,074,172 A * 12/1991 Fetter .................... B25B 13/483 81/125
5,074,173 A * 12/1991 Cearley ................. B25B 13/483 81/177.85
6,092,655 A 7/2000 Ernst
6,182,537 B1 * 2/2001 Vasichek ............... B25B 13/483 81/125
6,374,709 B1 * 4/2002 Vasichek ................ B25B 23/12 81/125
6,450,338 B1 9/2002 Chen
6,712,225 B2 3/2004 McNeely (Continued)

FOREIGN PATENT DOCUMENTS

CN 105027237 B * 7/2018 .............. F02P 13/00
DE 20016464 U1 * 12/2000 ........... B25B 13/483

(Continued)

OTHER PUBLICATIONS

International Search Report and Written Opinion for International Application No. PCT/US2022/038522 dated Nov. 14, 2022, 9 pages.

*Primary Examiner* — David B. Thomas

(74) *Attorney, Agent, or Firm* — Reinhart Boerner Van Deuren s.c.

(57) ABSTRACT

A tool for engaging a spark plug is provided. The tool includes a socket with an interior sidewall that forms at least a portion of a socket chamber. An insert may be positioned within the socket chamber. The insert has at least a rigid first component and a compliant second component configured to nest within the rigid first component.

17 Claims, 5 Drawing Sheets

(56) References Cited

U.S. PATENT DOCUMENTS

| | | | | |
|---|---|---|---|---|
| 7,104,164 | B2 * | 9/2006 | Jirele .................... | B25B 23/108 81/124.6 |
| 7,118,406 | B2 | 10/2006 | Mu et al. | |
| 7,658,284 | B2 | 2/2010 | Lin | |
| 7,753,216 | B2 | 7/2010 | Kao | |
| 7,841,480 | B2 | 11/2010 | Hsieh | |
| 7,931,159 | B2 | 4/2011 | Kao | |
| 8,096,516 | B2 | 1/2012 | Shiao | |
| 8,770,418 | B2 | 7/2014 | Ernst | |
| 9,051,103 | B2 | 6/2015 | Chiang | |
| 9,138,890 | B2 | 9/2015 | Lee | |
| 9,247,832 | B2 | 2/2016 | Chang | |
| 9,604,771 | B1 | 3/2017 | Chen | |
| 9,925,657 | B1 | 3/2018 | Kao | |
| 9,956,681 | B2 | 5/2018 | Kao | |
| 10,016,889 | B2 | 7/2018 | Kao | |
| 10,315,819 | B2 | 6/2019 | Jhu et al. | |
| 10,906,714 | B2 | 2/2021 | Chen | |
| 11,002,219 | B1 | 5/2021 | Cress | |
| 2002/0026859 | A1 | 3/2002 | Suzuki | |
| 2005/0102793 | A1 | 5/2005 | Shih | |
| 2006/0219647 | A1 | 10/2006 | Shih | |
| 2008/0047911 | A1 | 2/2008 | Kao | |
| 2009/0211408 | A1 | 8/2009 | Peng et al. | |
| 2009/0266956 | A1 | 10/2009 | Shih | |
| 2011/0314974 | A1 * | 12/2011 | Lan ........................ | B25G 1/025 81/177.6 |
| 2017/0152829 | A1 | 6/2017 | Ikeda et al. | |
| 2018/0054043 | A1 | 2/2018 | Niessner et al. | |
| 2019/0283220 | A1 * | 9/2019 | Blanchette .......... | B25B 13/5091 |

FOREIGN PATENT DOCUMENTS

| | | | | | |
|---|---|---|---|---|---|
| DE | 19955409 | | 5/2006 | | |
| DE | 102007056740 | | 12/2015 | | |
| EP | 1655112 | | 8/2007 | | |
| GB | 2200258 | A * | 7/1988 | ............. | H01T 13/05 |
| JP | 2002151231 | | 5/2002 | | |
| KR | 200158468 | Y1 * | 10/1999 | ............. | B25B 23/12 |

* cited by examiner

SPARK PLUG SOCKET

CROSS-REFERENCE TO RELATED APPLICATION

This application is a continuation of International Application No. PCT/US2022/038522, filed Jul. 27, 2022, which claims the benefit of and priority to U.S. Provisional Application No. 63/226,586, filed Jul. 28, 2021, the contents of which are incorporated herein by reference in their entireties.

BACKGROUND OF THE INVENTION

The present invention relates generally to the field of tools. The present invention relates specifically to a tool, such as a socket, with an insert for engaging a spark plug. The present invention further relates to an insert for use with a tool, the insert capable of engaging a spark plug.

SUMMARY OF THE INVENTION

One embodiment of the invention relates to a tool for engaging a spark plug, the tool including a tool engaging portion, and a workpiece engaging body. The workpiece engaging body includes a sidewall having sidewall defining a socket chamber. An insert is positioned within the socket chamber. The insert includes a first component and a second component. The first component includes a first material, and the second component includes a second material. In various embodiments, the second material is more compliant than the first material, is softer than the first material and/or is more elastic than the first material.

In specific embodiments, the first component is a generally hollow, cylindrical structure having a first component exterior surface and first component interior surface. The first component exterior surface is configured to engage the cylindrical sidewall during operation. The second component is a generally hollow, cylindrical structure that is configured to nest within the first component. The second component has a second component exterior surface configured to engage the first component interior surface. The second component further includes a generally annular compliant flange the extends inwardly toward the center of the second component, the annular flange forming an opening of sufficient size to permit receipt and engagement of a spark plug.

Another embodiment of the present disclosure relates to an insert for use with a tool for engaging a spark plug. The insert includes a first component and a second component. The first component is a generally hollow, cylindrical structure having a first component exterior surface and first component interior surface. The first component interior surface is comprised of an interior sidewall surface and an interior flange surface. The second component is a generally hollow cylindrical structure having a second component interior surface and a second component exterior surface. The second component exterior surface includes an exterior sidewall surface and an exterior ledge surface. When the insert is assembled, the second component is configured to nest within the first component, the exterior ledge complementing the interior flange surface and the exterior sidewall surface complementing the interior sidewall surface. The second component further includes a generally annular compliant flange sized to receive and engage a spark plug during operation. The first component is comprised of a first material and the second component is comprised of a second material. The first material is more rigid than the second material.

Another embodiment of the present disclosure relates to a socket for engaging a spark plug. The socket includes a tool engaging portion. A workpiece engaging body is coupled to the tool engaging portion. The workpiece engaging body has a sidewall that defines a socket chamber. An insert is positioned within the socket chamber. The insert has a first component comprising a first material and a second component comprising a second material. The first component has an exterior surface that is coupled to the sidewall of the workpiece engaging body such that the insert is maintained within the socket chamber. The second component is positioned within the first component. The second material is more compliant than the first material and is positioned to engage an outer surface of the spark plug.

Another embodiment of the present disclosure relates to a tool for engaging a spark plug. The tool includes a drive socket. A collar extends from the drive socket, and a workpiece engaging body extends from the collar. The workpiece engaging body includes a sidewall that defines a socket chamber. An insert is positioned within the socket chamber. The insert having a first component comprising a first material and a second component comprising a second material. The second component nests within the first component. Additionally, the second material is softer than the first material and is configured to engage the spark plug.

Another embodiment of the present disclosure relates to a tool for engaging a spark plug. The tool includes a tool engaging portion. A collar extends from the tool engaging portion, and a workpiece engaging body extends from the collar. The workpiece engaging body includes a sidewall that defines a socket chamber. An insert is coupled to the sidewall of the socket chamber via a friction fit between an outer surface of the insert and the sidewall. The insert has a first component comprising a first material and a second component comprising a second material. The second component is positioned within the first component. The second material is more elastic than the first material and is configured to engage the spark plug.

Alternative exemplary embodiments relate to other features and combinations of features as may be generally recited.

BRIEF DESCRIPTION OF THE DRAWINGS

This application will become more fully understood from the following detailed description, taken in conjunction with the accompanying figures, wherein like reference numerals refer to like elements in which.

DETAILED DESCRIPTION

Referring generally to the figures, various embodiments of a socket with an insert for engaging a spark plug are shown. A spark plug insert is used in connection with a socket to engage a spark plug, for instance, when it is time to remove and replace an old spark plug. Typical spark plug socket inserts are formed from a single material that must be both rigid enough to secure the insert in place within the socket and compliant enough to effectively engage the spark plug during operation. As discussed in greater detail below, Applicant has designed an insert including at least two components, a rigid component for securing the insert within the socket and a compliant component for engaging the spark plug during use of the socket. Applicant has found the combination of a compliant component nested within a rigid component to enhance both the ability of the insert to substantially maintain its position within the socket (e.g., via a high quality friction fit between the rigid component and the inner diameter of the socket body) and to effectively grip and engage the spark plug during operation.

Figure 1:
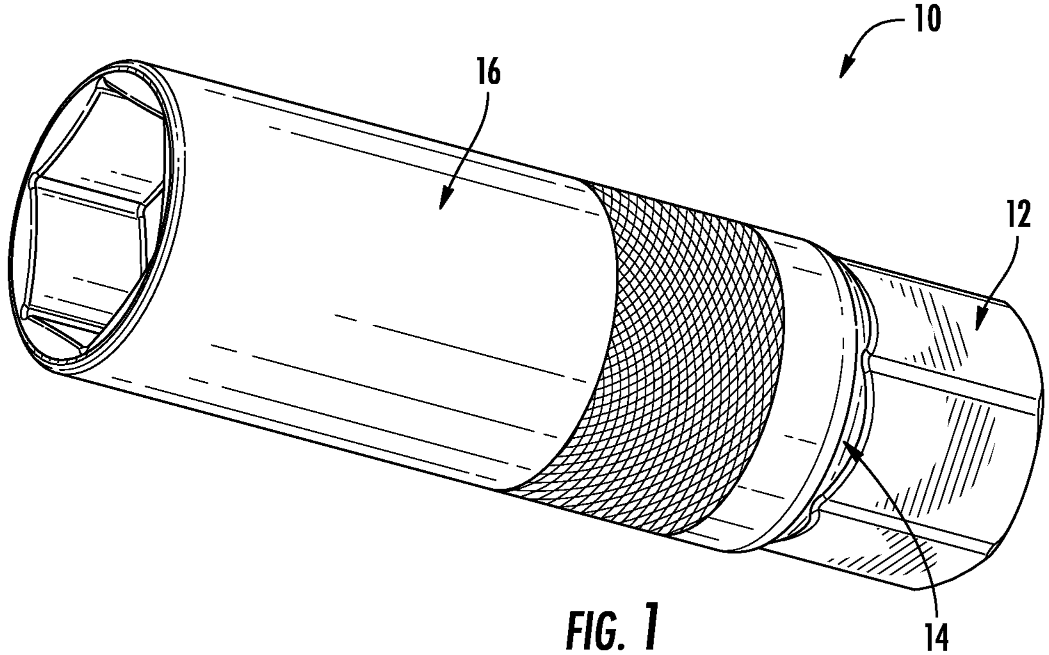
FIG. 1 is a perspective view of a spark plug socket, according to one embodiment of the present disclosure.
Figure 2:
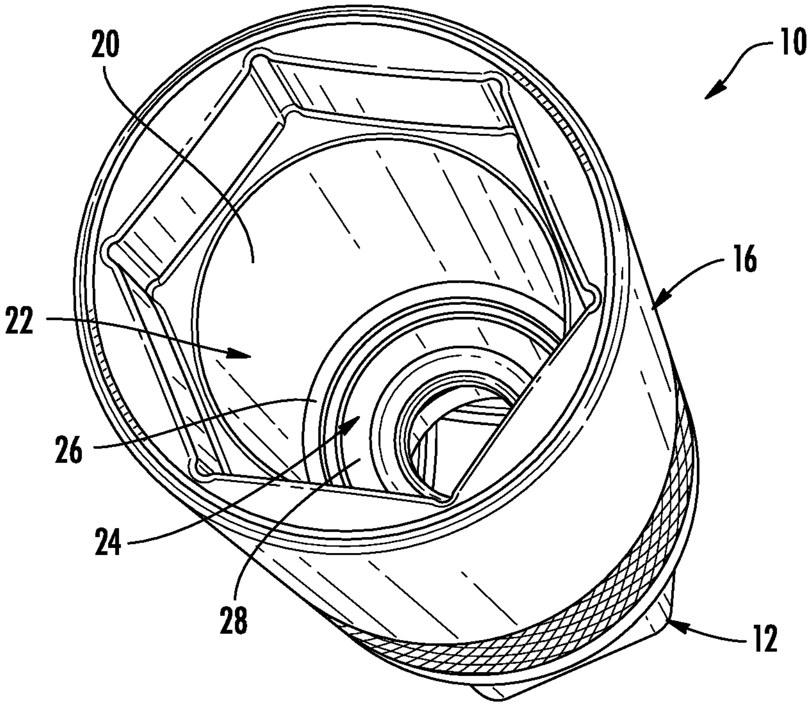
FIG. 2 is a first end perspective view of the socket shown in FIG. 1, showing a portion of an insert positioned on the interior of the socket.
Figure 3:
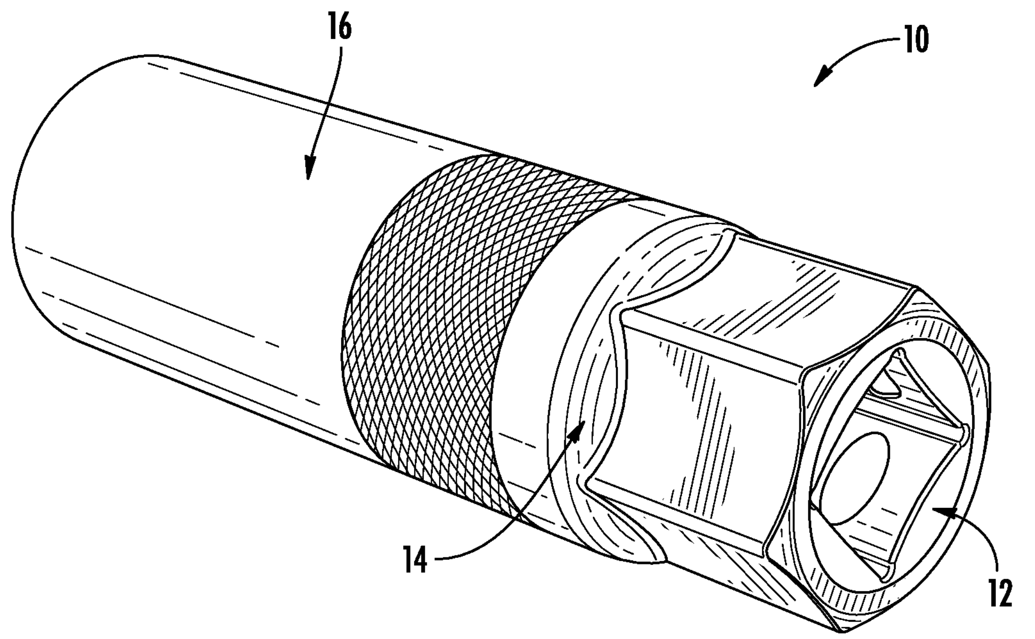
FIG. 3 is a second end perspective view of the socket shown in FIG. 1.
Figure 4:
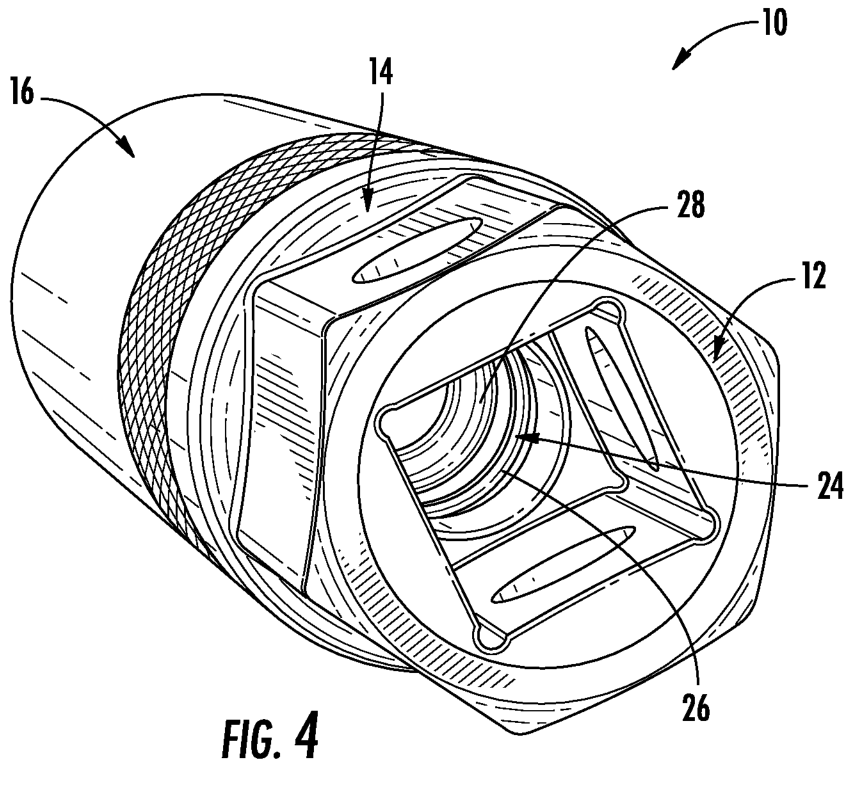
FIG. 4 is another second end perspective view of the socket shown in FIG. 3, showing a portion of the insert shown in FIG. 2.
Figure 5:
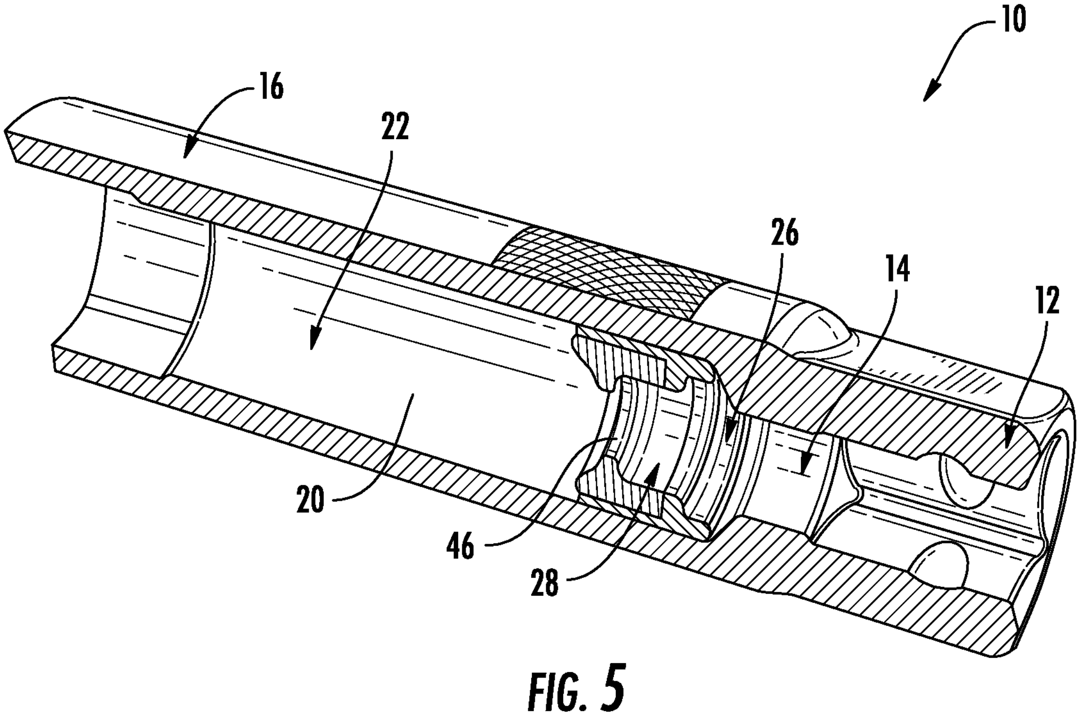
FIG. 5 is a perspective, sectional view of the socket shown in FIGS. 1-4.

FIGS. 1-4 show various perspective views of a socket tool, shown as spark plug socket 10, that includes an insert 24 for engaging a spark plug. In the embodiment shown, the spark plug socket 10 includes a tool engaging portion, shown drive socket 12, a collar 14 adjacent to the drive socket 12, and a workpiece engaging body, shown as hex socket 16, adjacent to the collar 14. Specifically, collar 14 extends from drive socket 12, and hex socket 16 extends from collar 14. The hex socket 16 includes an interior cylindrical sidewall 20, the cylindrical sidewall 20 forming at least a portion of a socket chamber 22. As shown in more detail in the cross-sectional views of FIGS. 5-5A, the insert 24 may be positioned within the socket chamber 22, such that the insert 24 engages a spark plug inserted into the socket chamber 22. While the spark plug socket 10 shown here is a ⅝" hex socket, in various embodiments, spark plug socket 10 may be sized larger or smaller than the ⅝" size shown. In such embodiments, the inserts discussed herein have dimensions suited for the different sized spark plug sockets. For example, an insert configured for use with a tool having a smaller socket chamber, may be proportionally decreased in size to maintain a viable fit within the socket chamber.

Figure 6:
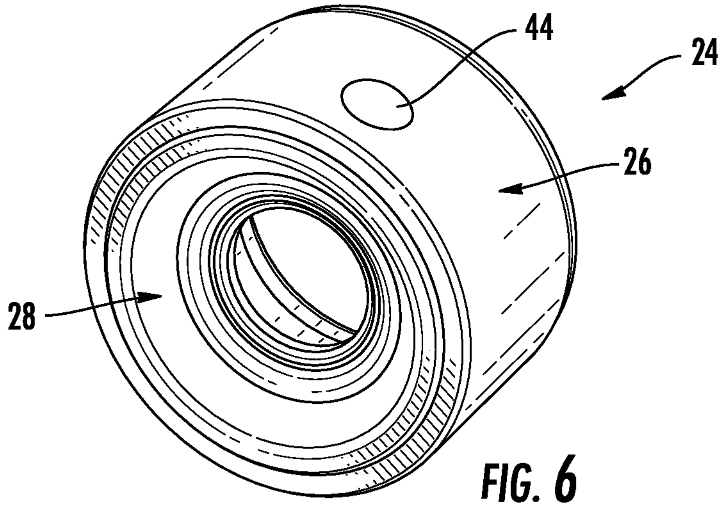
FIG. 6 is a perspective view of the insert shown in FIG. 2.
Figure 7:
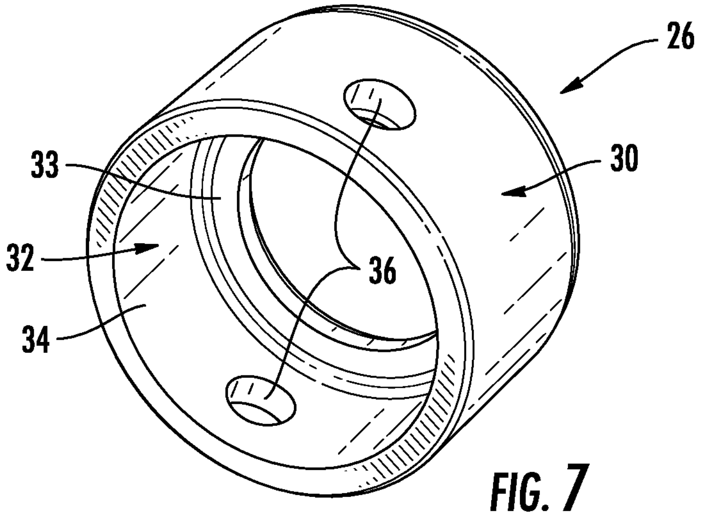
FIG. 7 is a perspective view of a first component of the insert shown in FIG. 6.
Figure 8:
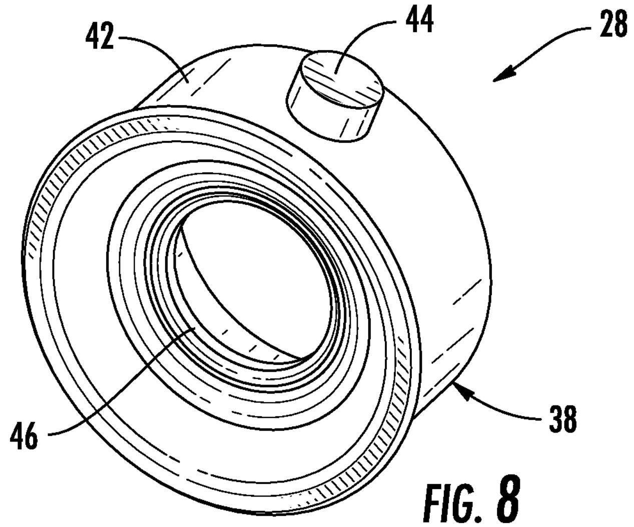
FIG. 8 is a perspective view of a second component of the insert shown in FIG. 6.
Figure 9:
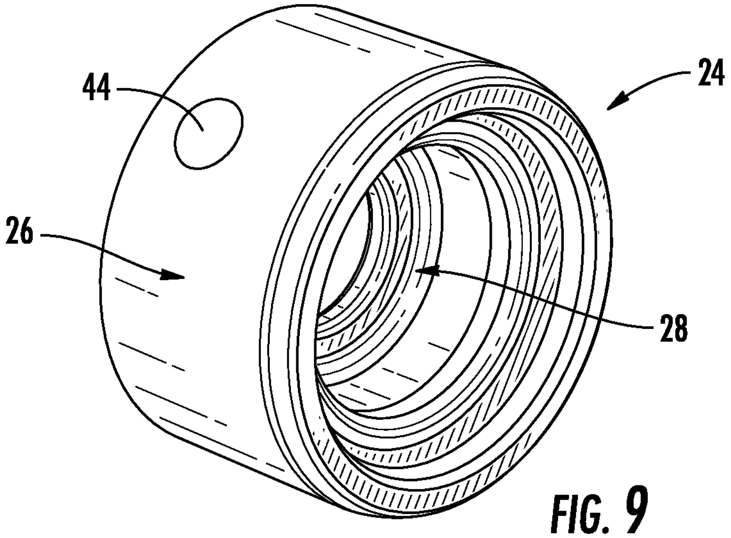
FIG. 9 is a second perspective view of the insert shown in FIG. 6.
Figure 10:
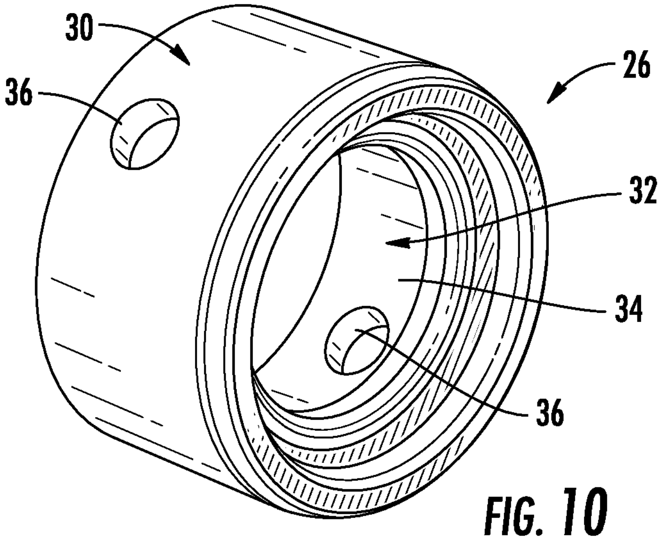
FIG. 10 is a perspective view of the first component of the insert shown in FIG. 9.

FIG. 6 shows a perspective view of the insert 24, as insert 24 would appear if viewed from the hex socket 16 end of the spark plug socket 10, and FIG. 9 shows a perspective view of the insert 24, as insert 24 would appear if viewed from the drive socket 12 end of the spark plug socket 10. In this embodiment, insert 24 is comprised of two components, a first component 26 (shown in greater detail in FIGS. 7 and 10) and a second component 28 (shown in greater detail in FIGS. 8 and 11) that is configured to nest within the first component 26. In general, first component 26 is formed from a rigid that provides a tight friction fit within socket chamber 22, and holds insert 24 in place, and second component 28 is formed from a softer, more compliant, less rigid and/or more elastic material that engages and grips a spark plug during use.

Figure 5A:
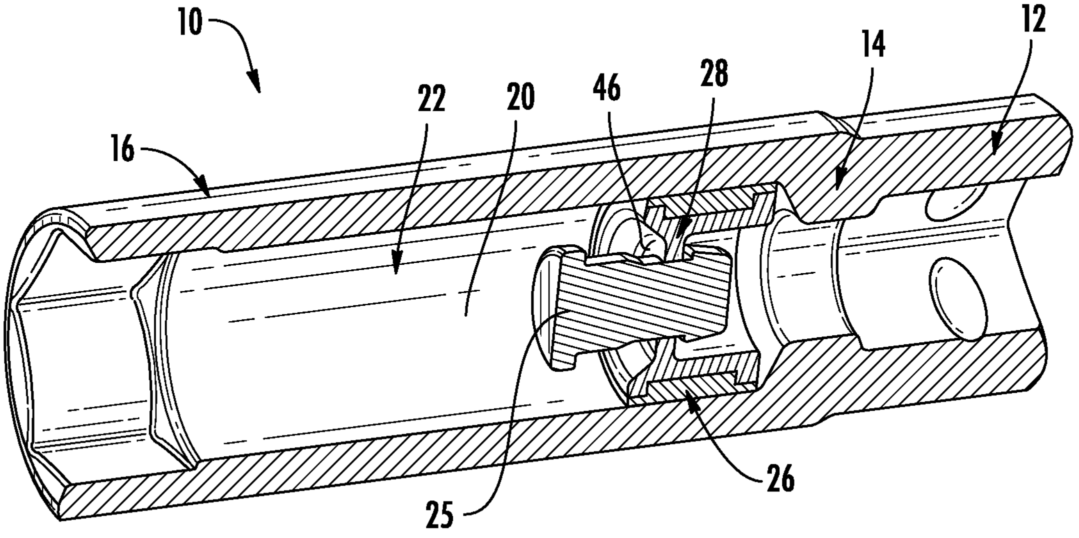
FIG. 5A is a perspective, sectional view of the socket shown in FIG. 5, showing a spark plug engaged by the insert, according to an exemplary embodiment.

The first component 26 is a generally hollow, cylindrical structure with an interior surface 32 and an exterior surface 30. The exterior surface 30 is configured to engage the cylindrical sidewall 20 of the socket chamber 22 forming a friction fit within sidewall 20 such that insert 24 is retained within socket chamber 22, particularly during engagement of a spark plug 25, as shown in FIG. 5A. The second component 28 may be a generally hollow, cylindrical structure with an exterior surface 38 configured to engage the interior surface 32 of the first component 26.

Referring to FIGS. 6-11, the interior surface 32 of the first component 26 includes interior annular flange surface 33 and an interior sidewall surface 34, the interior annular flange surface 33 extending inwardly adjacent one end of the interior sidewall surface 34. The exterior surface 38 of the second component 28 includes an exterior sidewall surface 42 and an exterior ledge surface 40 (see FIG. 11). When assembled, the exterior ledge surface 40 is configured to complement and nest against the interior annular flange surface 33 and the exterior sidewall surface 42 is configured to complement and nest against the interior sidewall surface 34.

In some embodiments, first component 26 includes one or more cavity 37 defined by a cavity surface 36 located through the interior sidewall surface 34. In the embodiment shown, the cavity surface 36 extends to the exterior surface 30, forming an opening (see FIG. 7). The second component 28 may include a corresponding protrusion 44, extending from the exterior surface 38, sized to nest against the cavity surface 36, adding securement to the connection between the first component 26 and the second component 28. Though the mating elements shown here take the form of a protrusion and corresponding cavity or opening, other mating elements capable of adding to the securement of the first component 26 to the second component 28 are permissible. In this embodiment, insert 24 includes two pairs of protrusions 44 and cavity surfaces 36 spaced approximately 180 degrees from each other around the circumference of first component 26. However, in other embodiments, insert 24 may include a different number of mating element pairs, e.g., 1, 3, 4, etc.

Figure 11:
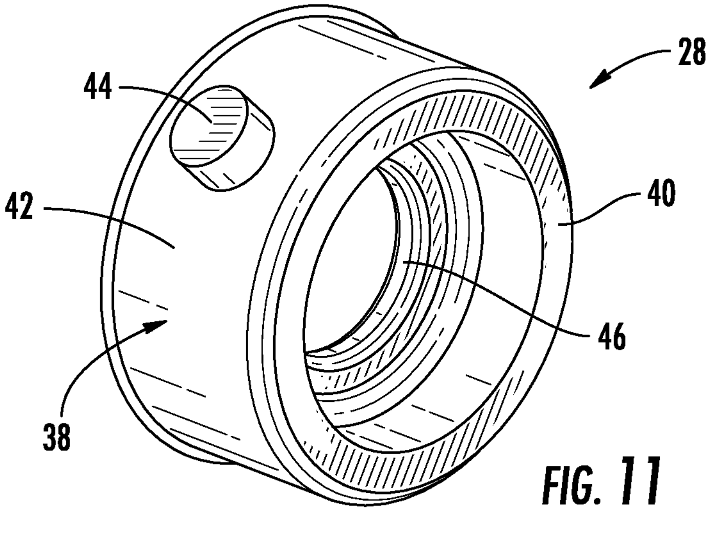
FIG. 11 is a perspective view of the second component of the insert shown in FIG. 9.

Referring to the second component 28 shown in detail in FIGS. 8 and 11, a compliant flange 46 extends inwardly toward the center of the second component 28. The compliant flange 45 may have an annular shape with an opening of sufficient size to permit receipt and engagement of a spark plug. Here, the second component 28 is comprised of a compliant material capable of gripping a spark plug with sufficient engagement to effectuate loosening of the spark plug for removal when the spark plug socket 10 is rotated along a longitudinal axis during operation. In the embodiment shown, the first component 26 is comprised of a generally rigid material. In contrast, the second component 28 is comprised of a generally compliant material. The greater rigidity of the first component 26 allows a greater friction force to develop between the first component 26 and the cylindrical sidewall 20 to secure the insert 24 in place relative to the spark plug socket 10 during operation while adding to the structural integrity of the insert 24. In contrast, the greater compliancy of the second component 28 allows a stronger grip to be achieved with respect to spark plug, and thus, permits a more secure engagement of the spark plug by the second component 28 during operation, compared to the engagement that could be achieved with a more rigid material.

In various embodiments, components 26 and 28 are each formed from different polymer materials from each other generally having the material properties discussed herein. In such embodiments, hex socket 16 is formed from a metal material. In various embodiments, component 26 is formed from a first polymer material having a first durometer, and component 28 is formed from a second polymer material having a second durometer, less than the first durometer. In various embodiments, component 26 is formed from a first polymer material having a first modulus of elasticity, and component 28 is formed from a second polymer material having a second modulus of elasticity, less than the first modulus of elasticity. In specific embodiments, first component 26 is formed from polypropylene, and second component 28 is formed from TPU having a shore A durometer of 30-70 and more specifically of 50.

It should be understood that the figures illustrate the exemplary embodiments in detail, and it should be understood that the present application is not limited to the details or methodology set forth in the description or illustrated in the figures. It should also be understood that the terminology is for description purposes only and should not be regarded as limiting.

Further modifications and alternative embodiments of various aspects of the invention will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention. In addition, as used herein, the article "a" is intended to include one or more component or element, and is not intended to be construed as meaning only one.

Various embodiments of the invention relate to any combination of any of the features, and any such combination of features may be claimed in this or future applications. Any of the features, elements or components of any of the exemplary embodiments discussed above may be utilized alone or in combination with any of the features, elements or components of any of the other embodiments discussed above.

What is claimed is:

1. A socket for engaging a spark plug, the socket comprising:

a tool engaging portion; and a workpiece engaging body coupled to the tool engaging portion, the workpiece engaging body having a sidewall that defines a socket chamber; and an insert positioned within the socket chamber, the insert having a first component comprising a first material and a second component comprising a second material;

wherein the first component has an exterior surface that is coupled to the sidewall of the workpiece engaging body such that the insert is maintained within the socket chamber;

wherein the second component is positioned within the first component;

wherein the second component defines an opening that is surrounded by the first component and the second component;

wherein the second material is more compliant than the first material and is positioned to engage an outer surface of the spark plug; and wherein, when a spark plug is inserted into the socket chamber, the spark plug is received within the opening; and wherein the second component defines a cylindrical structure comprising an exterior surface that engages the first component.

2. The socket of claim 1, wherein the exterior surface of the first component is coupled to the sidewall of the workpiece engaging body via a friction fit.

3. The socket of claim 1, wherein the workpiece engaging body is a hex socket, and wherein the tool engaging portion is a drive socket.

4. The socket of claim 1, wherein the workpiece engaging body comprises a third material, wherein the first material comprises a first polymer material, wherein the second material comprises a second polymer material, wherein the third material comprises a metal material, and wherein the workpiece engaging body is integrally formed with the tool engaging portion.

5. A tool for engaging a spark plug, the tool comprising:

a drive socket;

a collar that extends from the drive socket; and a workpiece engaging body that extends from the collar, the workpiece engaging body comprising:

a sidewall that defines a socket chamber, and an insert positioned within the socket chamber, the insert having a first component comprising a first material and a second component comprising a second material;

wherein the second component nests within the first component; and wherein the second material is softer than the first material and is configured to engage the spark plug; and wherein the first component has a first cylindrical structure having an interior surface and an exterior surface, wherein the exterior surface engages the sidewall of the socket chamber.

6. The tool of claim 5, wherein the insert is coupled to the socket chamber via a friction fit between the exterior surface of the first cylindrical structure and the sidewall of the socket chamber.

7. The tool of claim 5, wherein the second component has a second cylindrical structure having an exterior surface that engages the interior surface of the first component.

8. The tool of claim 5, wherein the interior surface of the first component further comprises an interior sidewall surface and interior annular flange that extends from the interior sidewall surface, wherein the second component further comprises an exterior annular ledge, and wherein the exterior annular ledge nests against the interior annular flange.

9. The tool of claim 8, wherein the second component further comprises a compliant flange configured to engage the spark plug, wherein the compliant flange extends inwardly toward a center of the second component.

10. The tool of claim 9, wherein the compliant flange is annular.

11. The tool of claim 5, wherein the workpiece engaging body is a hex socket.

12. A tool for engaging a spark plug, the tool comprising:
a tool engaging portion;
a collar that extends from the tool engaging portion; and
a workpiece engaging body that extends from the collar, the workpiece engaging body comprising:
a sidewall that defines a socket chamber, and
an insert coupled to the sidewall of the socket chamber via a friction fit between an outer surface of the insert and the sidewall, the insert having a first component comprising a first material and a second component comprising a second material;
wherein the second component is positioned within the first component;
wherein the second material is more elastic than the first material and is configured to engage the spark plug; and
wherein the second component defines an opening configured to receive and engage a spark plug; and
wherein the second component includes an annular flange that extends inwardly toward a center of the second component.

13. The tool of claim 12, wherein the annular flange comprises a compliant material configured to grip the spark plug.

14. The tool of claim 12, wherein the first component defines a first hollow structure comprising a first mating element, and wherein the second component defines a second hollow structure comprising a second mating element that engages the first mating element.

15. The tool of claim 14, wherein the first hollow structure comprises a first sidewall having an interior sidewall surface, wherein the second hollow structure comprises a second sidewall having an exterior sidewall surface, wherein the first mating element comprises a cavity defined within the interior sidewall surface of the first component, and wherein the second mating element comprises a protrusion that extends outwardly from the exterior sidewall surface of the second component and corresponds to the cavity defined within the interior sidewall surface of the first component.

16. The tool of claim 15, wherein the cavity extends through the first sidewall, defining an opening in the first sidewall.

17. The tool of claim 12, wherein the workpiece engaging body is a socket.

* * * * *